US012783046B2

(12) United States Patent
Austin et al.

(10) Patent No.: US 12,783,046 B2
(45) Date of Patent: Nov. 3, 2026

(54) SYSTEMS AND METHODS FOR DISPLAYING DYNAMIC CLOSED-CAPTIONING CONTENT

(71) Applicant: Toyota Motor Engineering & Manufacturing North America, Inc., Plano, TX (US)

(72) Inventors: Benjamin Piya Austin, Saline, MI (US); Heishiro Toyoda, Mountain View, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/913,220

(22) Filed: Oct. 11, 2024

(65) Prior Publication Data

US 2025/0036199 A1 Jan. 30, 2025

Related U.S. Application Data

(63) Continuation of application No. 18/348,791, filed on Jul. 7, 2023, now Pat. No. 12,141,353.

(51) Int. Cl.
*G06F 3/01* (2006.01)
*G09G 3/00* (2006.01)

(52) U.S. Cl.
CPC ............ *G06F 3/013* (2013.01); *G09G 3/002* (2013.01); *G09G 2354/00* (2013.01)

(58) Field of Classification Search
CPC ................................ G06F 3/012; G06F 3/013
See application file for complete search history.

(56) References Cited

U.S. PATENT DOCUMENTS

| | | | | |
|---|---|---|---|---|
| 7,221,405 | B2 | 5/2007 | Basson et al. | |
| 8,248,528 | B2 | 8/2012 | Hosking et al. | |
| 10,447,960 | B2 | 10/2019 | Wilairat et al. | |
| 2013/0030811 | A1* | 1/2013 | Olleon ................ | G06V 40/107 348/148 |
| 2015/0277552 | A1 | 10/2015 | Wilairat | |
| 2016/0107577 | A1* | 4/2016 | Niles ...................... | G10L 25/48 704/8 |

(Continued)

FOREIGN PATENT DOCUMENTS

| | | |
|---|---|---|
| CN | 111263238 B | 9/2021 |
| KR | 102431383 B1 | 8/2022 |

*Primary Examiner* — Robin J Mishler
(74) *Attorney, Agent, or Firm* — Dinsmore & Shohl LLP

(57) ABSTRACT

Systems and methods for displaying dynamic closed-captioning content are disclosed. In one embodiment, a system includes a user monitoring device for monitoring one or more characteristics of at least one user viewing display content produced by a display device, one or more processors, and a non-transitory computer-readable medium storing instructions that, when executed by the one or more processors, cause the one or more instructions to receive user data from the user monitoring device that corresponds to the one or more characteristics of the at least one user, determine a comprehension state of the at least one user based at least in part on the user data, and adjust a closed-captioning state of closed-captioning of the display content based on the comprehension state.

18 Claims, 8 Drawing Sheets

(56) References Cited

U.S. PATENT DOCUMENTS

| | | | | |
|---|---|---|---|---|
| 2016/0212417 | A1 | 7/2016 | Ng | |
| 2017/0186431 | A1 | 6/2017 | Didik | |
| 2017/0208321 | A1 | 7/2017 | Monnerat | |
| 2018/0302687 | A1 | 10/2018 | Bhattacharjee | |
| 2020/0189390 | A1* | 6/2020 | Viswanathan | B60K 35/10 |
| 2022/0108624 | A1* | 4/2022 | Kwatra | G06V 20/41 |
| 2023/0343050 | A1 | 10/2023 | Kim | |

* cited by examiner

SYSTEMS AND METHODS FOR DISPLAYING DYNAMIC CLOSED-CAPTIONING CONTENT

CROSS-REFERENCE TO RELATED APPLICATIONS

This application is a continuation of U.S. patent application Ser. No. 18/348,791 filed on Jul. 7, 2023 and entitled "Systems and Methods for Displaying Dynamic Closed-Captioning Content," the contents of which is incorporated by reference in its entirety.

TECHNICAL FIELD

The present specification relates to closed-captioning and, more particularly, dynamically adjusted closed-captioning content.

BACKGROUND

When some users view content, such as movies and television shows, they may have difficulty hearing the dialogue. Such users may use closed-captioning that displays text representing the spoken dialogue. However, the dialogue may be fast and/or users may be slow readers (e.g., non-native language closed-captioning) and may not understand the text before it is replaced by new text. Each user is different and may have different reading and/or comprehension abilities. Current closed-captioning systems do not account for the hearing and/or reading abilities of individual users.

Accordingly, alternative systems and methods for displaying closed-captioning content may be desired.

SUMMARY

In one embodiment, a system includes a user monitoring device for monitoring at least one user viewing display content produced by a display device, one or more processors, and a non-transitory computer-readable medium storing instructions that, when executed by the one or more processors, cause the one or more instructions to receive user data from the user monitoring device that corresponds to one or more characteristics of the at least one user, determine a comprehension state of the at least one user based at least in part on the user data, and adjust a closed-captioning state of closed-captioning of the display content based on the comprehension state.

In another embodiment, a system includes a display device having an array of multi-view pixels, each multi-view pixel being capable of emitting light in a plurality of directions, a user monitoring device for monitoring one or more characteristics of a plurality of users viewing display content produced by the display device, one or more processors, and a non-transitory computer-readable medium storing instructions that, when executed by the one or more processors, cause the one or more instructions to receive user data from the user monitoring device that corresponds to the user data of each user of the plurality of users, determine a comprehension state of each user of the plurality of users based at least in part on the user data, and for each user, adjust an individual closed-captioning state of closed-captioning of the display content based on the comprehension state and a viewing angle of the user.

In yet another embodiment, a method for displaying closed-captioning content includes receiving user data from a user monitoring device that corresponds to one or more characteristics of the at least one user, determining a comprehension state of the at least one user based at least in part on the user data, and adjusting a closed-captioning state of closed-captioning of the display content based on the comprehension state.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein are directed to systems and methods for generating closed-captioning content that is customized for individual users to account for the comprehension abilities of the individual users. The personalized closed-captioning content assists in the user to better comprehend the dialogue of displayed content, such as movies, television shows, live broadcasts, online videos, and the like.

More particularly, embodiments employ gaze tracking, facial characteristic recognition, and physiological data to determine whether or not a user is comprehending the display content in the form of audio information (e.g., spoken language) or visual information (e.g., text of closed-captioning). Adjustments to the closed-captioning are made based on the comprehension determination. For example, if the gaze tracking data, facial characteristic recognition data, and/or the physiological data is/are indicative that a person is having a hard time understanding spoken dialogue, closed-captioning may start, or an option to start closed-captioning may be presented. As another example, if closed-captioning is currently being displayed and the gaze tracking data, facial characteristic recognition data, and/or the physiological data is/are indicative is/are indicative that a person is having a hard time reading and comprehending the text, adjustments may be made to the closed-captioning, such as slowing it down, or making shorter summarized sentences so the user can more easily understand the display content that is presented.

"Closed-captioning" means any text that is displayed that represents speech and/or unspoken sounds present in display content, and includes captions an subtitles.

Various embodiments of systems and methods for generating closed-captioning are described in detail below.

Figure 1:
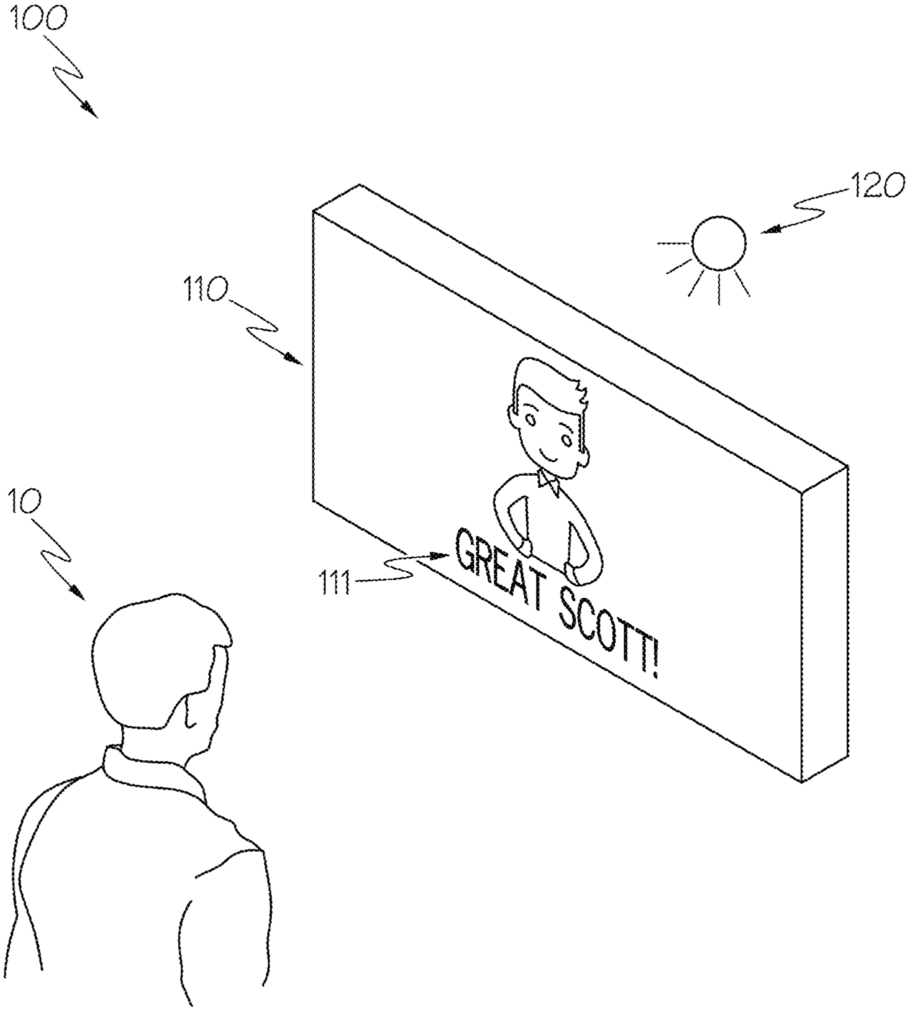
FIG. 1 illustrates an example system for displaying dynamic closed-captioning content according to one or more embodiments described and illustrated herein.
Figure 2:
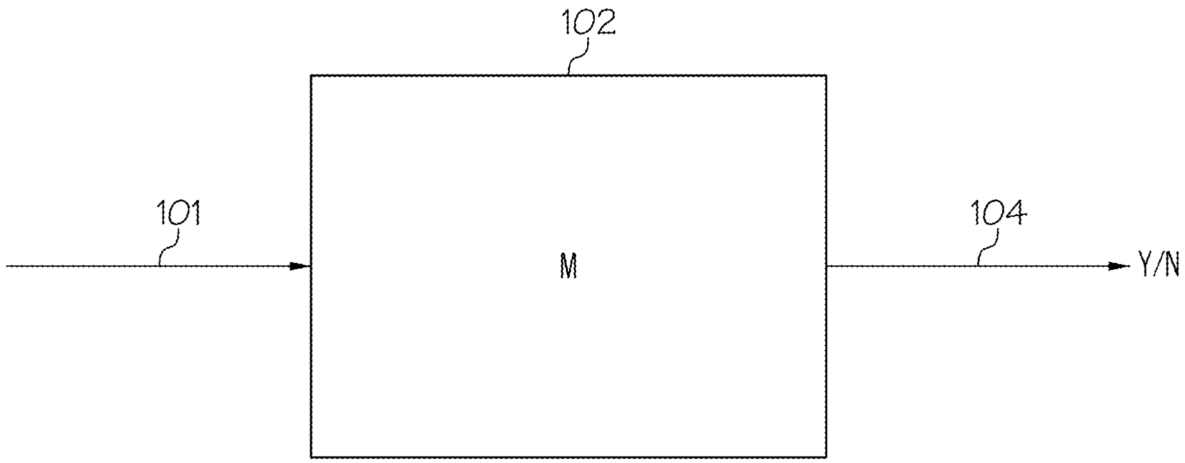
FIG. 2 illustrates an example trained model according to one or more embodiments described and illustrated herein.

Referring now to FIG. 1, a user 10 is watching a movie using an example system 100 that includes a display device 110 and a user monitoring device 120. The display device 110 may be television, for example. The display device 110 may produce audio content, or the system 100 may include a separate audio system (not shown) that produces corresponding audio content of the displayed content.

In the illustrated example, the display device 110 is displaying closed-captioning text 110 in addition to the movie images. The closed-captioning text 110 corresponds to the dialogue of the movie (or other type of media) or other sounds. The closed-captioning text 110 may be displayed at a particular speed, such as the speed of the spoken dialogue, or a speed that is faster or slower than the spoken dialogue. The word "speed" means the duration of time that individual sentences or phrases are displayed, or the speed at which letters or words are sequentially displayed on the display.

The user 10 may have trouble comprehending the closed-captioning text 110 for a variety of reasons. The user 10 may be elderly and have difficulty seeing or reading text. As another example, the user 10 may be a non-native speaker of the closed-captioning text 110. Other reasons are also possible. In such cases, the closed-captioning state of the closed-captioning text 110 should be adjusted to make it easier for the user 10 to comprehend the information. For example, the closed-captioning state may be adjusted by increasing the duration that the closed-captioning text 110 is displayed on the screen, or reducing the number of words that are displayed while still providing the same information (i.e., a summarization of the spoken dialogue).

People tend to make facial expressions and demonstrate key body language when they do not understand spoken or written language. For example, people may furrow their brows, squint their eyes, purse their lips or frown, move closer to the source of the information, turn their head to the side to put one ear in-line with the source of the spoken language, put their hand on their chin, and/or many other expressions or actions. Examples of user gazes that are indicative of non-comprehension include looking off in the distance when not understanding spoken dialogue, or re-reading captions when not understanding written dialogue. Examples of physiological data indicating non-comprehension include, but are not limited to, changes in breathing patterns, heart rate, arousal (galvanic skin response), which can all be measured by wearable smart devices. These actions and/or physiological characteristics are indicative of not understanding information that is presented. Embodiments of the present disclosure use a user monitoring system and a trained model to detect the gaze, facial expressions, actions and/or physiological features of the user and make a determination as to whether or not the user comprehends the information. Corrective action is taken when the trained model indicates that the user does not comprehend the information based on the output for the user monitoring device.

Still referring to FIG. 1, the user monitoring device may include one or more sensors 120 having a field of view on the user 10. The one or more sensors 120 may be any type of a sensor capable of detecting the gaze, facial expressions, actions, and/or physiological characteristics of the user 10. Non-limiting examples include RGB camera sensors, infrared sensors, and RGB-D sensors that detect not only light in the visible spectrum but also depth using an infrared sensor. The one or more sensors 120 may also include one or more physiological sensors, such as a heart rate sensor, galvanic sensor, and the like.

Thus, the user monitoring device is capable of producing user data including gaze data, facial data, and/or physiological data associated with the user 10. As stated above, certain facial expressions, positions, movements, and physiological characteristics of a person are indicative of whether or not the person comprehends information.

The user data 101 is provided as input to a trained model 102 that produces an output 104 as to whether or not the user 10 comprehends the presented information (i.e., a comprehension state of the user 10). The trained model 102 may be trained on user data associated with facial expressions, positions, movements, and/or physiological characteristics indicative of a person not comprehending spoken or written language. For example, the trained model 102 may be provided labeled user data of people having furrowed brows, squinted eyes, and the like, in response to not understanding information.

The trained model 102 may be trained using training data derived from the population as a whole. In some embodiments, the trained model 102 may be trained on historical data from specific users to provide a personalized trained model. This personalized trained model may provide better estimations as to whether or not the specific user comprehends the information. For example, furrowed brows may indicate non-comprehension for one person, but may be a default state for another person and not associated with comprehension.

Embodiments are not limited by the type of trained model 102. As a non-limiting example, the trained model 102 may be a classifier model configured to output "yes comprehension" or "no comprehension" as the output 104.

When the trained model 102 outputs a comprehension state of "no comprehension" as the output 104, corrective action may be taken, such as to adjust a closed-captioning state of the system 100. As an example, if the current state of the closed-captioning state of the system 100 is no closed-captioning (i.e., closed-captioning is turned off), and the trained model 102 produces an output 104 of "no comprehension," the closed-captioning state may be changed to turn closed-captioning on. If the current closed-captioning state is closed-captioning on, and the trained model 102 produces an output 104 of "no comprehension," the closed-captioning state may be changed by slowing down the closed-captioning text and/or shortening the closed-captioning text.

In this manner, the closed-captioning state may be dynamically and continuously updated based on the comprehension state of the user 10, and without user intervention.

FIG. 1 illustrates a single user 10 viewing a display device 110 configured as a television screen. In some embodiments, multiple users may be viewing a single display device. The sensor 120 can be used to generate user data for a plurality of users viewing the display device 110. The system 100 may be configured to set the closed-captioning state of the display device 110 to a state that corresponds to the user who needs the most assistance in understanding the content. The user needing the most assistance is prioritized.

Figure 3A:
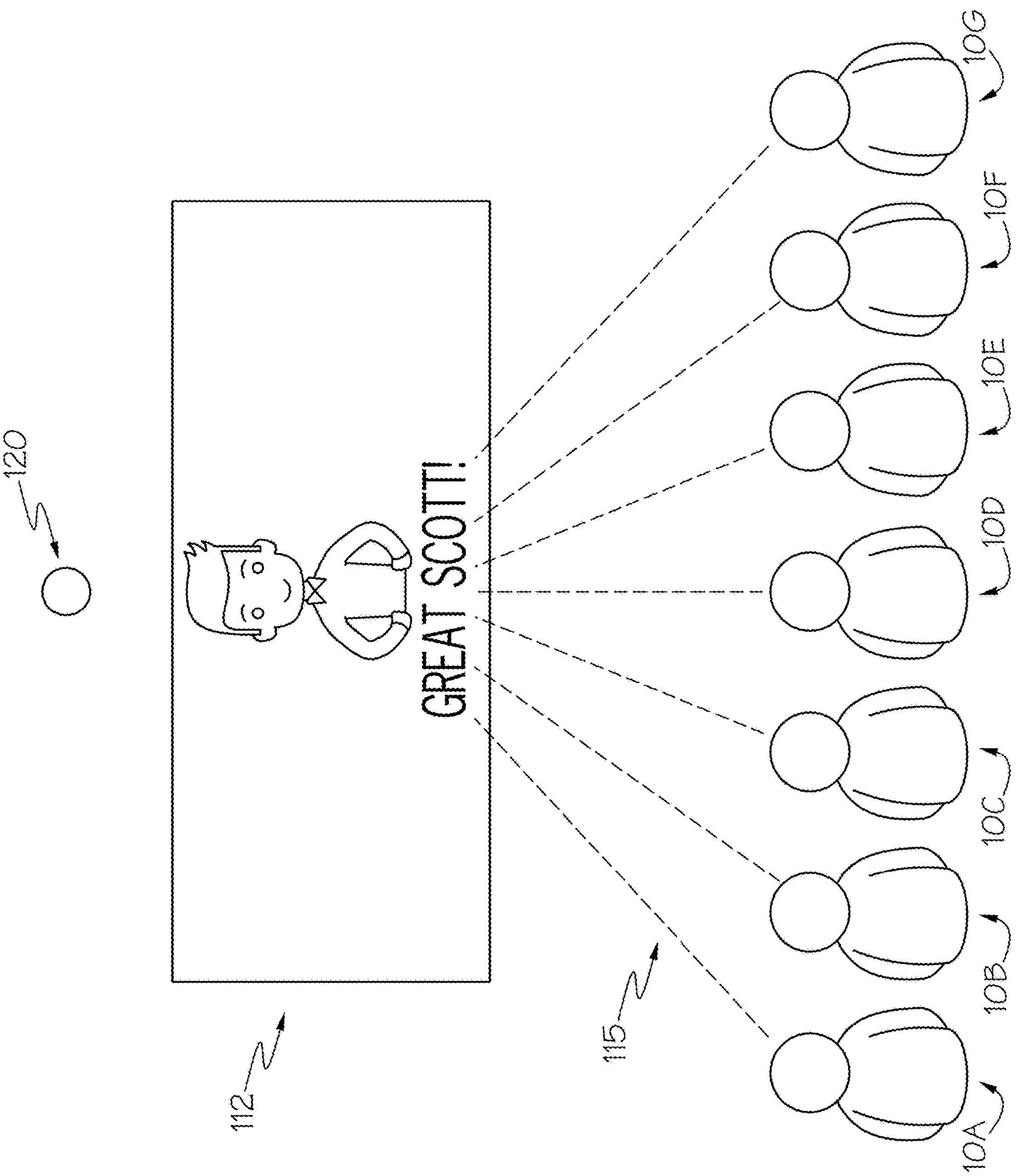
FIG. 3A illustrates another example system for displaying dynamic closed-captioning content according to one or more embodiments described and illustrated herein.

In some embodiments, the display device is operable to display personalized closed-captioning text to individual users. FIG. 3A illustrates a display device 112 configured as a large display capable of presenting display content to a plurality of users 10A-10G. The user monitoring device is configured as one or more sensors 120 operable to generate user data for each of the plurality of users 10A-10G. Each user 10A-10G has a different viewing angle of the display device 112, as indicated by lines 115. The display device is operable to produce personalized visual content to each user of the plurality of users 10A-10G. Thus, personalized closed-captioning can be presented to each individual user 10A-10G. For example, user 10B may not see any closed-captioning while user 10G may receive closed-captioning at a first speed and user 10E may receive closed-captioning at a second speed. Thus, the closed-captioning state for each user is personalized based on an individual viewing angle for an individual user. This embodiment may be advantageous because a person who does not need closed-captioning may be annoyed if it is present.

Figure 3B:
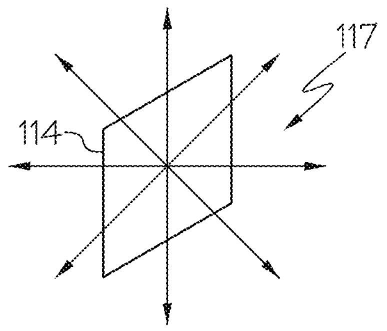
FIG. 3B illustrates a multi-view pixel of a display device according to one or more embodiments described and illustrated herein.

To display personalized closed-captioning information to a plurality of users, the display device 112 may have an array of multi-view pixels, with each multi-view pixel being capable of emitting light in a plurality of directions. FIG. 3B illustrates an example multi-view pixel 114 that is capable of emitting light in targeted directions as indicated by arrows 117. The direction of light that is emitted may be controlled to display personalized visual content, such as closed-captioning text, to individual users. In this manner, the different users may see different closed-captioning text. As a non-limiting example, the display device 112 may be a Parallel Reality™ display device developed by Misapplied-Sciences in Pasadena, California. The Parallel Reality display device is capable of simultaneously displaying personalized content to hundreds or thousands of viewers. The display can present individual images to individual users based on viewing angle.

Embodiments are not limited to display content that is produced by an electronic display. Rather, embodiments may display close-captioning information based on analog displays, such as road signs, for example. A driver may have difficulty seeing a road sign, for example. The driver's vision may be bad, fog or precipitation may make the road sign difficult to see, or she may have simply not seen the road sign. The closed-captioning information may be supplemental text that is displayed to the driver in a display, such as a heads-up display, in a digital instrument cluster, and/or on an infotainment system display, or on an augmented reality windshield where the text can be superimposed directly on/below the road sign.

Figure 4:
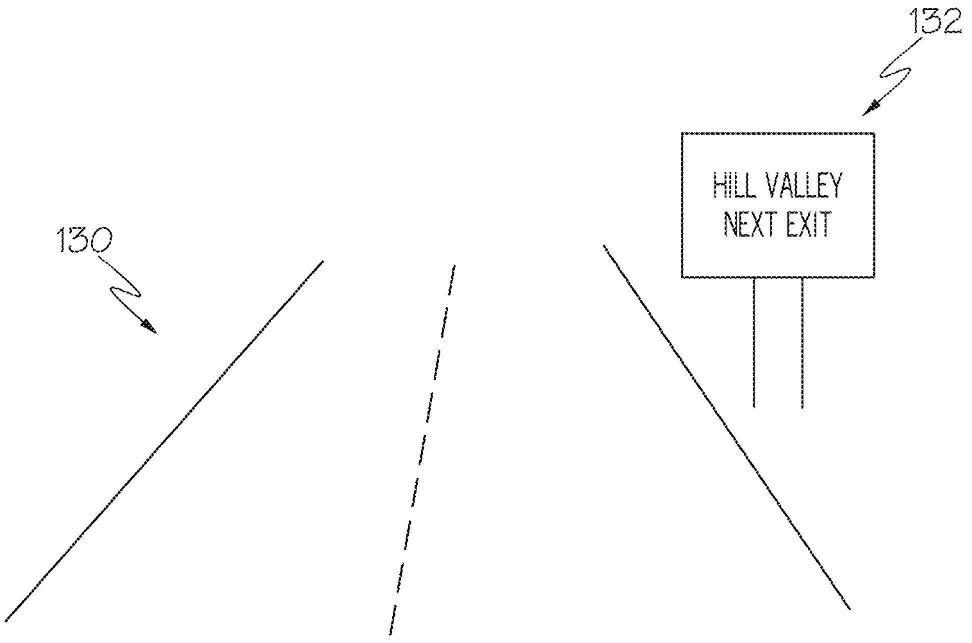
FIG. 4 illustrates a field of view from a cabin of a vehicle according to one or more embodiments described and illustrated herein.

FIG. 4 illustrates a view of a road 130 from a cabin of a vehicle. There is a road sign 132 that shows display content: "Hill Valley, Next Exit." The driver of the vehicle may or may not see or otherwise comprehend the text of the road sign 132. A user monitoring device, such as the sensors 120 described above, is positioned within the cabin such that it has a field of view of the driver (see FIG. 5). A user may also be wearing a smart watch having biometric sensors that act as the one or more sensors 120 of the user monitoring device. As described above, a trained model 102 is operable to receive user data from the sensor 120 as input data and produce an output 104 as to whether or not the driver has comprehended the display content. If it is determined that the driver has not seen or otherwise comprehended the display content based on the user data, (e.g., the driver furrows her brow, squints her eyes, and/or looks over her shoulder to try to see the display content of the sign 132), a closed-captioning in the form of text content may be displayed on one or more displays of the vehicle.

In some embodiments, the trained model 102 may receive characteristics of a particular user as well as characteristics of certain types of text as input data. Such characteristics include, but are not limited to, the language skill of the user (e.g., foreigners or non-native speakers) and the importance of the text. For example, road signs may be prioritized over billboard signs, or urgent construction signs may be prioritized over "Scenic Route" signs.

Figure 5:
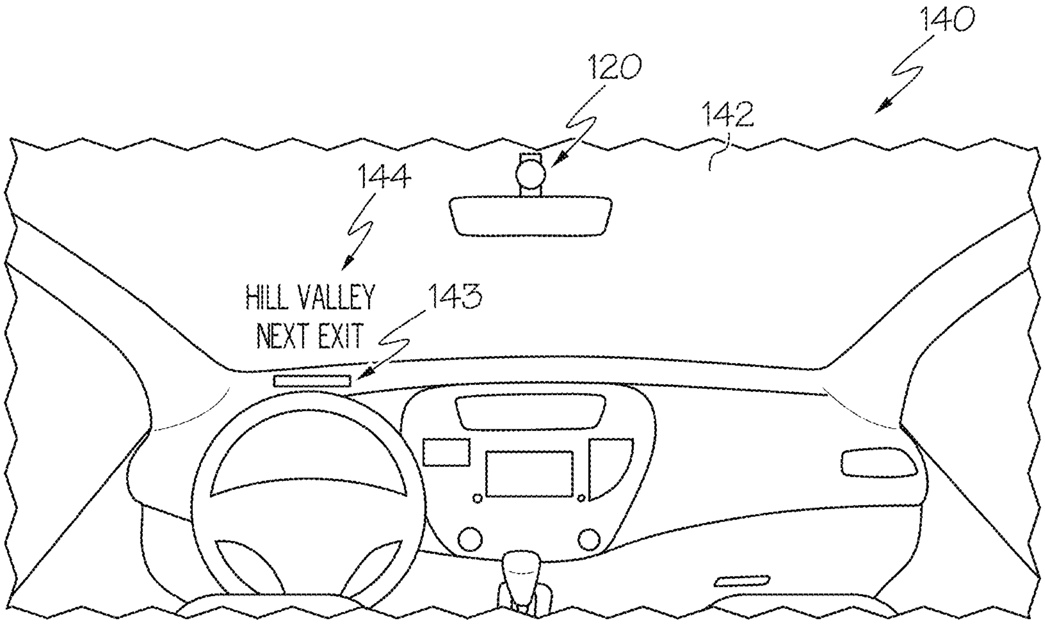
FIG. 5 illustrates closed-captioning content in the form of a heads-up display image according to one or more embodiments described and illustrated herein.

Referring to FIG. 5, the closed-captioning content 144 is displayed by way of a heads-up display 143. The closed-captioning content 144 may be the text of the road-sign that the driver had difficulty seeing. In the illustrated example, the closed-captioning content 144 is projected onto a windshield 142 such that it is viewable to the driver within the cabin 140 of the vehicle. FIG. 5 further shows that the sensor 120 for the gaze device may be positioned on or within a rear-view mirror within the cabin 140.

Figure 6:
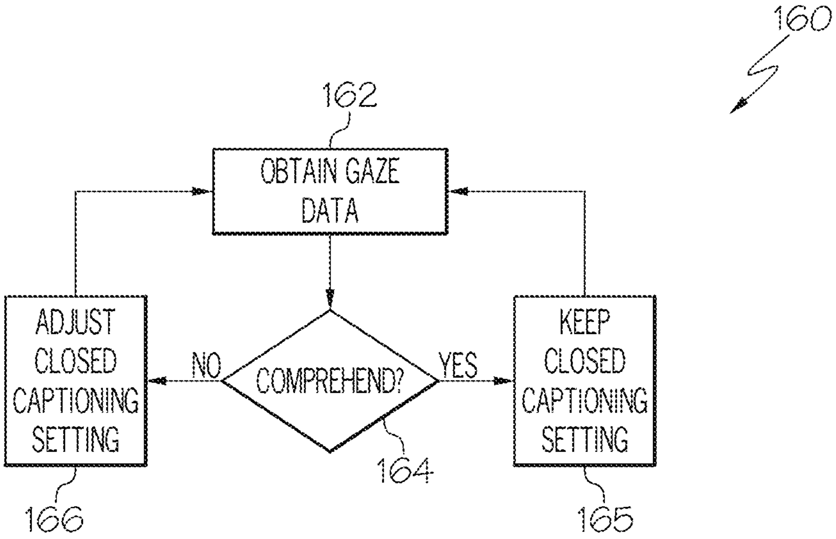
FIG. 6 illustrates an example method for displaying closed-captioning content according to one or more embodiments described and illustrated herein.

FIG. 6 is a flowchart 160 illustrating an example method for displaying closed-captioning content. At block 162, user data obtained from a user monitoring device, such as the one or more sensors 120 described above and illustrated in FIG. 1. The user data includes data with respect to the facial expression, position of the head, movement of the head of a user, and/or physiological data of a user. For example, the user data may be video data of the user's face and head. Next, it is determined whether or not the user has comprehended content produced by a display device at block 164. A trained model receives user data of the user and produces an output as to whether or not the user has comprehended the content. If the answer is yes at block 164, the method moves to block 165, where the current closed-captioning setting or state is maintained (e.g., off, first speed, second speed, summary mode, etc.). If the answer is no at block 164, the method moves to block 166 where corrective action is taken by adjusting the closed-captioning setting or state. For example, the closed-captioning is currently off, then it may be turned on at block 166. As another example, if the closed-captioning is currently on, the speed of the closed-captioning or the closed-captioning content may be adjusted at block 166. As a further example, the display content (e.g., movie) may be paused until the user has finished reading the closed-captioning, and when the user has finished reading the closed-captioning, the display content may be un-paused. In another example, the play-back speed of the display content may be slowed down to match the average reading pace of the particular user. At both block 165 and 166 the method moves back to block 162 so that the closed-captioning setting may be dynamically and continuously monitored and updated.

Figure 7:
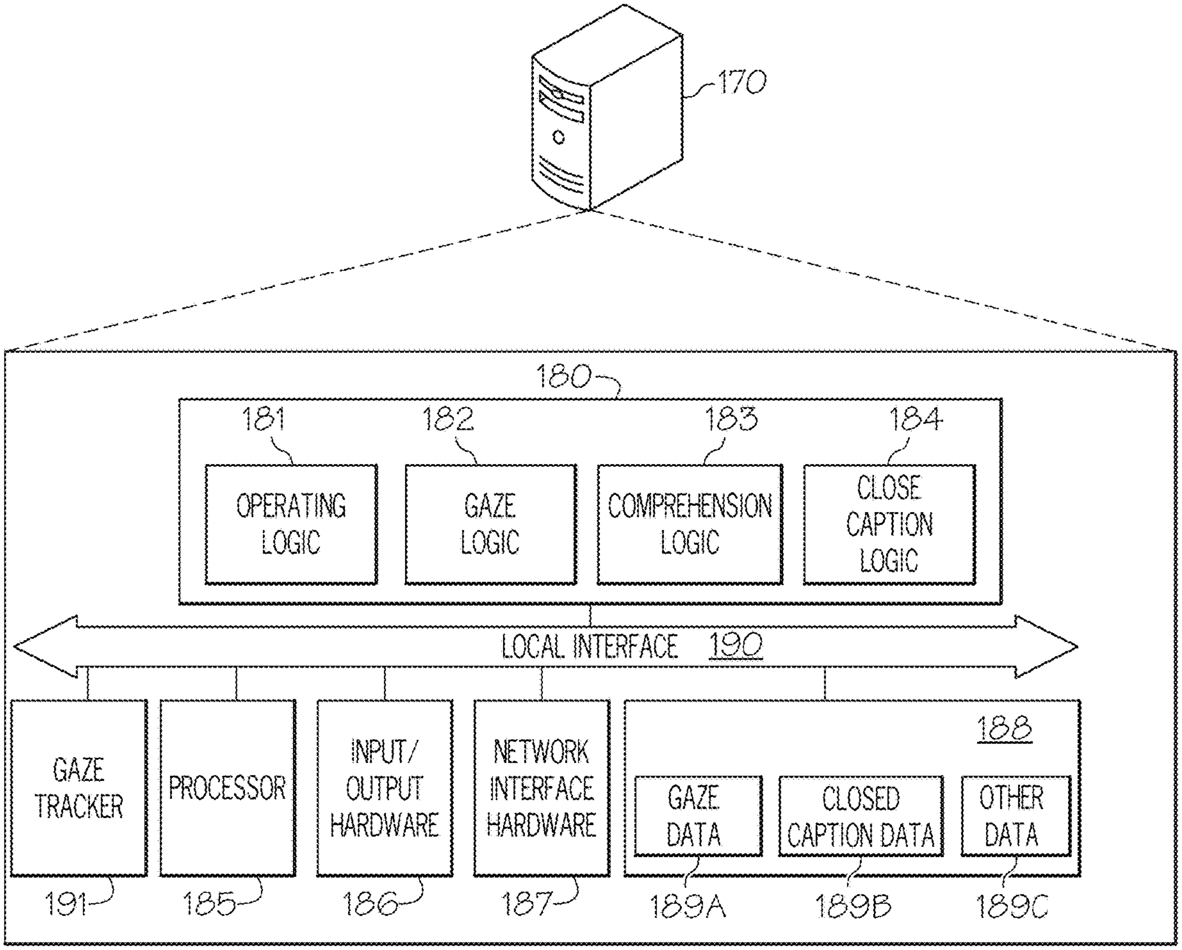
FIG. 7 illustrates an example computer device for displaying closed-captioning content according to one or more embodiments described and illustrated herein.

Embodiments of the present disclosure may be implemented by a computing device, and may be embodied as computer-readable instructions stored on a non-transitory memory device. Referring now to FIG. 7, an example system for providing a virtual environment as a computing device 170 is schematically illustrated. The example computing device 170 provides a system for generating a virtual manufacturing environment, and/or a non-transitory computer usable medium having computer readable program code for generating a virtual manufacturing environment embodied as hardware, software, and/or firmware, according to embodiments shown and described herein. While in some embodiments, the computing device 170 may be configured as a general purpose computer with the requisite hardware, software, and/or firmware, in some embodiments, the computing device 170 may be configured as a special purpose computer designed specifically for performing the functionality described herein. It should be understood that the software, hardware, and/or firmware components depicted in FIG. 7 may also be provided in other computing devices external to the computing device 170 (e.g., data storage devices, remote server computing devices, and the like).

As also illustrated in FIG. 7, the computing device 170 (or other additional computing devices) may include a processor 185, input/output hardware 186, network interface hardware 187, a data storage hardware 188 (which may include recorded user data 189A (e.g., data regarding the facial expressions, head position, head movement of the user, physiological characteristics of the user, and the like), closed-captioning data 189B (e.g., data relating to the closed-captioning text to be displayed), and any other data 189C for performing the functionalities described herein), and a non-transitory memory component 180. The memory component 180 may be configured as volatile and/or non-volatile computer readable medium and, as such, may include random access memory (including SRAM, DRAM, and/or other types of random access memory), flash memory, registers, compact discs (CD), digital versatile discs (DVD), and/or other types of storage components.

Additionally, the memory component 180 may be configured to store operating logic 181 for operating the computing system, gaze logic 182 for gathering and storing user data, comprehension logic 183 for determining a comprehension state of the user, and closed-captioning logic 184 for displaying closed-captioning to a user (each of which may be embodied as computer readable program code, firmware, or hardware, as an example). It should be understood that the data storage hardware 188 may reside local to and/or remote from the computing device 170, and may be configured to store one or more pieces of data for access by the computing device 170 and/or other components.

A local interface 190 is also included in FIG. 7 and may be implemented as a bus or other interface to facilitate communication among the components of the computing device 170.

The processor 185 may include any processing component configured to receive and execute computer readable code instructions (such as from the data storage hardware 188 and/or memory component 180). The input/output hardware 186 may include virtual reality headset, graphics display device, keyboard, mouse, printer, camera, microphone, speaker, touch-screen, and/or other device for receiving, sending, and/or presenting data. The network interface hardware 187 may include any wired or wireless networking hardware, such as a modem, LAN port, wireless fidelity (Wi-Fi) card, WiMax card, mobile communications hardware, and/or other hardware for communicating with other networks and/or devices, such as to communicate with the vehicle sensors and the environment sensors (i.e., a transceiver). The network interface hardware 187 may communicate via the Internet to receive vehicle data provided from one or more sources as well as communicate with a display device, such as virtual reality headset to display the virtual vehicle and virtual environment.

Included in the memory component 180 may be the operating logic 181, gaze logic 182, comprehension logic 183, and closed-captioning logic 184. The operating logic 181 may include an operating system and/or other software for managing components of the computing device 170. Similarly, the gaze logic 182 may reside in the memory component 180 and may be configured to receive and store user data from one or more user monitoring devices. The comprehension logic 183 also may reside in the memory component 180 and may be configured to determine a comprehension state of the user based on the user data, such as by use of the trained model. The closed-captioning logic 184 includes logic to what and how to display closed-captioning content on a display device.

The components illustrated in FIG. 7 are merely exemplary and are not intended to limit the scope of this disclosure. More specifically, while the components in FIG. 7 are illustrated as residing within the computing device 170, this is a non-limiting example. In some embodiments, one or more of the components may reside external to the computing device 170.

It should now be understood that embodiments of the present disclosure provide personalized closed-captioning to users based on user data generated by a user monitoring device and a trained model. The trained model is operable to determine whether or not a user has comprehended content. If not, then a closed-captioning state may be adjusted. In some embodiments, personalized closed-captioning content may be simultaneously provided to a plurality of users by way of a display device having an array of multi-view pixels.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A vehicle comprising:

a user monitoring device for monitoring at least one user viewing an environment;

a display device;

one or more processors; and a non-transitory computer-readable medium storing instructions that, when executed by the one or more processors, cause the one or more processors to:

receive user data automatically from the user monitoring device without user intervention, wherein the user data corresponds to one or more visual characteristics of the at least one user including gaze direction, facial expression, movement and physiological characteristics;

determine, based on only the visual characteristics of the user data, that at least one of the at least one user did not comprehend a sign in the environment; and display text of the sign on the display device;

wherein the display of road signs are prioritized over the display of billboard signs without user intervention.

2. The vehicle of claim 1, wherein determining that the user did not comprehend a sign in the environment is performed by inputting the user data into a trained model that is trained to output a comprehension state.

3. The vehicle of claim 2, wherein the trained model is a classifier operable to output a yes comprehension state and a no comprehension state.

4. The vehicle of claim 1, wherein the display device is a heads-up display.

5. The vehicle of claim 4, wherein the text is displayed on or below the sign.

6. The vehicle of claim 1, wherein the display device is an infotainment display device.

7. A method for displaying closed-captioning content, the method comprising:

receiving user data automatically from a user monitoring device without user intervention, wherein the user data corresponds to one or more visual characteristics of at least one user within a vehicle including gaze direction, facial expression, movement and physiological characteristics;

determining, based on only the visual characteristics of the user data, that at least one of the at least one user did not comprehend a sign in the environment; and displaying text of the sign on a display device;

wherein the display of road signs are prioritized over the display of billboard signs without user intervention.

8. The method of claim 7, wherein determining that the user did not comprehend a sign in the environment is performed by inputting the user data into a trained model that is trained to output a comprehension state.

9. The method of claim 8, wherein the trained model is a classifier operable to output a yes comprehension state and a no comprehension state.

10. The method of claim 7, wherein the display device is a heads-up display.

11. The method of claim 7, wherein the text is displayed on or below the sign.

12. The method of claim 7, wherein the display device is an infotainment display device.

13. The method of claim 7, wherein display of road signs is prioritized over display of billboard signs without user intervention.

14. The vehicle of claim 1, wherein the text displayed is personalized to the at least one user.

15. The vehicle of claim 14, wherein personalizing the text displayed comprises making summarized sentences of the text displayed.

16. The vehicle of claim 1, wherein the display of urgent construction signs are prioritized over the display of scenic route signs without user intervention.

17. The method of claim 7, wherein the text displayed is personalized to the at least one user.

18. The method of claim 17, wherein personalizing the text displayed comprises making summarized sentences of the text displayed.

* * * * *